E. F. GALLAUDE.
ELECTRIC GAUGE.
APPLICATION FILED SEPT. 26, 1917.
1,424,637.
Patented Aug. 1, 1922.
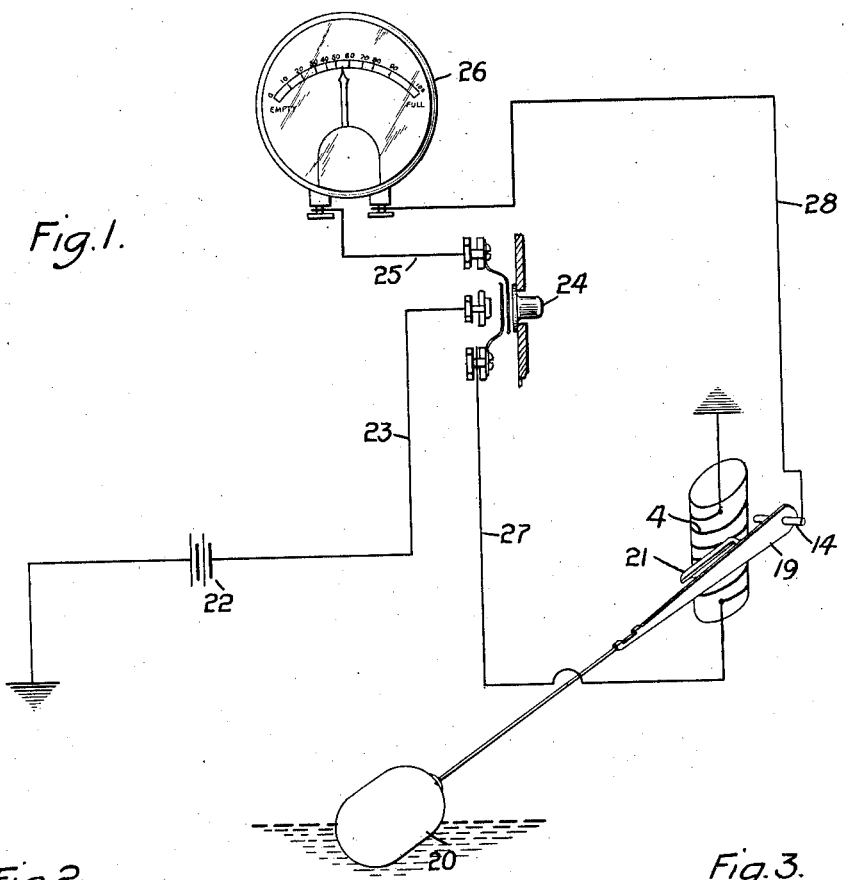
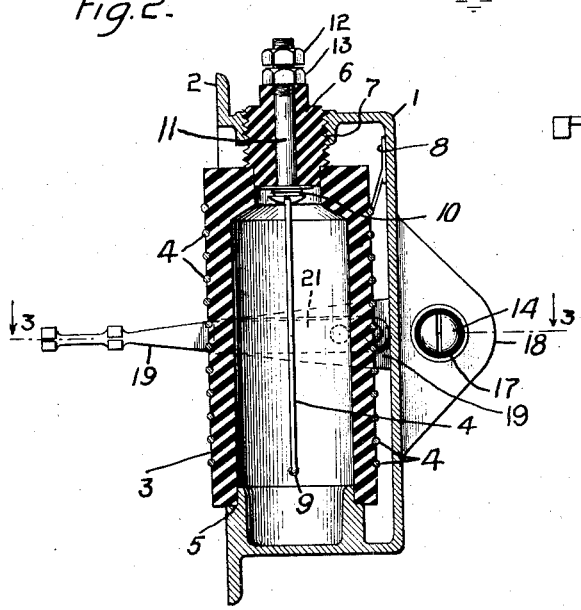
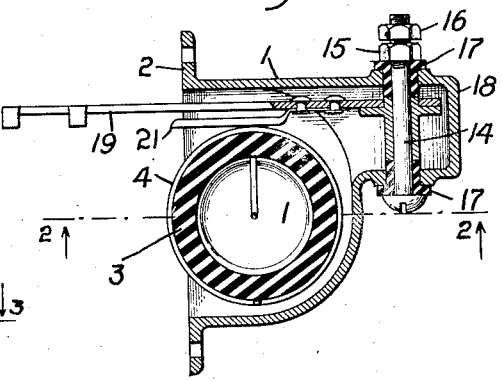
Edson F. Gallaudet
INVENTOR.
BY Wm. B. Whitney
ATTORNEYS.

UNITED STATES PATENT OFFICE.

EDSON F. GALLAUDET, OF PROVIDENCE, RHODE ISLAND.

ELECTRIC GAUGE.

1,424,637.

Specification of Letters Patent.

Patented Aug. 1, 1922.

Application filed September 26, 1917. Serial No. 193,258.

*To all whom it may concern:*

Be it known that I, EDSON F. GALLAUDET, a citizen of the United States, and a resident of the city of Providence, in the county of Providence and State of Rhode Island, have invented a new and useful Electric Gauge, of which the following is a specification.

My invention relates to a gauge of a type actuated by a float to indicate the level, and thereby the quantity, of a fluid within its container; more particularly, to a gauge for the fuel tank of a gas engine by which the operator of an aeroplane or automobile, for example, can readily read the amount of gasolene remaining in the tank of his engine, although it may be found equally available for many other purposes.

It is especially important that the pilot of an aeroplane should be able to known at all times the quantity of gasolene left in the tank of his engine, and, with the increasing size and complexity of aircraft, it has become essential that the dials of all instruments shall be assembled on an instrument board in front of the operator where they can be read easily and quickly.

Gasolene gauges are almost universally made with a float inside of the tank, connected to an indicator outside in such manner that the float, controlled by the level of the gasolene, operates the indicator, which may be mounted upon a conveniently located instrument board whenever a sufficiently flexible connection with the float is permitted. But, while an electrical connection through insulated wires has the advantage of maximum flexibility, electric gauges have heretofore been avoided from fear that sparks caused by changes in connections in some part of the circuit near the tank might ignite the gasolene vapor and cause an explosion.

The object of the present invention is to provide an electric gauge in which sparking is impossible, making it safe for use on gasolene tanks and especially on the gasolene tanks of aeroplanes.

My improved gauge consists, essentially, of a suitable source of electric energy, a meter, and in circuit therewith a variable resistance which is controlled by the tank float, the principle of operation being based upon the law that the drop in potential in an electric circuit is proportional to the resistance therein.

In its preferred form I employ a battery of two dry cells, connected together in series and having a total capacity of say three volts, a volt meter adapted to register the entire electromotive force of the battery, a coil of fine resistance wire which is wound on a spool of insulating material mounted within the gasolene tank in such manner that a brush, moving with the float and wide enough to span two or three turns of the wire of the coil at once, will sweep over the coil as the float is raised or lowered by changes in the level of the gasolene. The battery, conveniently located anywhere, is grounded on one side and on the other is connected through a push button switch both with one terminal of the volt meter, which with the push button is mounted on the instrument board, and with the lower end of the resistance coil the upper end of which is grounded. The second terminal of the volt meter is connected with the movable brush which, without ever breaking the circuit at this point, varies the amount of the resistance in series with the volt meter in direct proportion to the level of the gasolene in the tank. Consequently, whenever the connections are closed by pressing back the push button, the volt meter will receive and its pointer will indicate an electromotive force proportioned directly to the height of the float, thereby showing the quantity of gasolene in the tank.

I thus secure the advantage of flexible electric connections, while the voltage employed is so low and the resistance in the circuit is so high that the volume of the current is not sufficient to form a spark. Furthermore, the mechanism of the gauge is so arranged that the entire circuit is closed at all times, except at the push button switch on the instrument board by which the connections can be made long enough to read the meter and then left open to prevent the rapid exhaustion of the battery, so that no sparking can occur within or near the tank even though the current were strong enough to produce it.

The construction and the operation of the device will be fully understood by reference to the accompanying drawings, in which—

Figure 1 is a view showing diagrammatically the principal parts of the gauge and their electrical connections, and Fig. 2, a vertical section on the line 2 2 of Fig. 3, and Fig. 3, a horizontal section on the line 3 3 of Fig. 2, through the casing in which the resistance coil, float arm, and contact brush are mounted and attached to the wall of the tank.

As here illustrated, the casing 1, of suitable material, is open on one side and is provided with a flanged edge 2 by which it is connected to the side of the tank around an opening in its wall. A spool 3 of non-conducting material about which is coiled the resistance wire 4, wound preferably in a shallow helical groove by which the turns of the wire will be held in place, rests at its lower end upon an annular shoulder 5 on the bottom of the casing and is secured in position therein by the shouldered lower end of a screw plug 6, also of insulating material, which is inserted in a threaded opening 7 provided therefor in the top of the casing. The upper end of the resistance coil is soldered at 8 to the wall of the casing, by which it is grounded. From the lower end of the coil the wire, after being passed through an opening 9 in the side of the spool, is carried upwardly therein and soldered at 10 to a screw bolt 11 which extends up through the insulating plug and serves as a binding post for the lower end of the coil, the two nuts 12 and 13 serving the first to secure the bolt in place within the plug and the second to clamp thereto the end of an outside wire. A second screw bolt 14, similarly provided with two nuts 15 and 16, is secured horizontally in insulating bushings 17 17 set in openings in the sides of an outward projection 18 in the casing and directly opposite the vertical center and somewhat to one side of the resistance coil. Upon this screw bolt as a pivot is mounted, between the inner ends of the two bushings, the float arm 19 which, extending past the spool on one side and out through the open side of the casing, carries attached to its free end the tank float 20 (see Fig. 1) and opposite the spool, the contact brush 21, this brush bearing lightly against the bare sides of the wire of the resistance coil and being in electrical connection with the pivot bolt as a binding post.

The two-cell battery 22, grounded on one side preferably on the casing 1, is on the other side connected by the wire 23 to one terminal of the push button switch 24 and through that switch by the wire 25 to one terminal of the volt meter 26 and by the wire 27, attached to the screw bolt 11, to the lower end of the resistance coil. The other terminal of the volt meter is connected by the wire 28 to the pivot bolt 14 and by it and the float arm to the contact brush.

Thus, if the tank is full, the float will be in its most elevated position, the contact brush will bear against the upper end of the resistance coil, and the volt meter, whenever the connections are closed at the push button switch, will receive the entire electromotive force of the battery and register three volts, or full tank. Similarly, when the tank is empty, the float will be at the bottom of the tank and hold the contact brush against the lower end of the resistance coil, and accordingly the volt meter, both of its terminals being connected to the coil at the same point with no difference of potential between them, will read zero, or tank empty. And at any intermediate level of gasolene, the brush will make contact with the resistance coil at a proportionally intermediate point in its length and the volt meter will receive an electromotive force in proportion to the distance of such contact point from the lower end of the coil and will indicate a corresponding proportion of the full three volts or of the gasolene to the full capacity of the tank.

Owing to the fact that the contact brush moves through the arc of a circle while the coil, for convenience of manufacture, is wound on a straight spool, the scale of the volt meter should be specially calibrated, as shown. In the specific gauge illustrated, the ten lines which represent each a ten per cent change in the level of the gasolene correspond to the following readings on the ordinary scale of the volt meter, viz: .38 .66 .92 1.10 1.32 1.54 1.74 2.00 2.30 3.00 volts.

The electric gauge constructed as shown and described is applicable to any tank containing an oily fluid, like gasolene, kerosene, lubricating oil, etc., which will not short circuit the resistance coil, and can be used on automobiles, trucks, and boats, as well as on aeroplanes. If it is desired to use the gauge on tanks containing other fluids, the construction will have to be changed in ways obvious to those skilled in the art.

While I have shown and specifically described only that embodiment of my invention which I now consider to be best adapted for the purpose in view, it will, of course, be understood that the construction can be variously modified in its several details, within the scope of the appended claims, without departing from the spirit or sacrificing the advantages of the invention.

What I claim as new, and desire to secure by Letters Patent, is—

1. In an electric gauge, a float-controlled rheostat comprising as elements thereof a spool of non-conducting material, a resistance coil wound upon the spool and secured in position thereon, a float, and a brush mounted to move with the float to sweep one side of the resistance coil and of a width to bridge two adjoining turns thereof.

2. In an electric gauge, a float-controlled rheostat comprising as elements thereof a spool of non-conducting material with a helical groove in its outer surface, a resistance coil wound upon the spool in the helical groove, a pivotally mounted arm carrying a float at its outer end, and a brush carried by the float arm adapted to sweep the side of the resistance as the float rises and falls and of a width to bridge two adjoining turns thereof.

3. A float-controlled rheostat comprising in combination a casing to receive fluids, a spool of non-conducting material vertically mounted within the casing, a resistance wire coiled about the spool and electrically connected at one end to a circuit terminal mounted in and insulated from a wall of the casing, an arm carrying a float mounted within the casing to swing vertically in proximity to one side of the coil, and a brush carried by the float arm in contact with the coil and electrically connected to a second terminal also mounted in and insulated from a wall of the casing.

4. A float-controlled rheostat comprising in combination a casing open along one side and adapted to be attached to the wall of a tank in communication with the interior thereof, a resistance coil mounted vertically within the casing and electrically connected at one end to the casing and at the other end to a circuit terminal outside the casing, a float carrying arm pivotally mounted to swing vertically in proximity to a side of the coil and extending outwardly through the open side of the casing, and a brush carried by the float arm in contact with the coil and electrically connected to a circuit terminal outside the casing.

5. A float-controlled rheostat comprising in combination a casing open along one side and adapted to be attached to the wall of a tank in communication with the interior thereof, a spool of non-conducting material having a helical groove in its outer surface mounted within the casing, a resistance wire coiled about the spool in the helical groove and electrically connected at one end to a circuit terminal mounted in and insulated from a wall of the casing, a float carrying an arm pivotally mounted to swing vertically in proximity to a side of the resistance coil and extending outwardly through the open side of the casing, and a brush carried by the float arm in contact with the resistance coil and electrically connected to a second circuit terminal mounted in and insulated from a wall of the casing.

EDSON F. GALLAUDET.